US012049421B2

(12) United States Patent
Shi et al.

(10) Patent No.: US 12,049,421 B2
(45) Date of Patent: Jul. 30, 2024

(54) CUTTING METHOD AND EQUIPMENT OF AUXILIARY PACKAGING CONTAINERS FOR TESTING

(71) Applicant: FATO AUTOMATION TECHNOLOGY CO., LTD, Zhejiang Province (CN)

(72) Inventors: Hongwen Shi, Zhejiang Province (CN); Hongwei Shi, Zhejiang Province (CN); Zhengwen Wang, Zhejiang Province (CN); Quanchuan Zhuang, Zhejiang Province (CN)

(73) Assignee: FATO AUTOMATION TECHNOLOGY CO., LTD., Zhejiang Province (CN)

( * ) Notice: Subject to any disclaimer, the term of this patent is extended or adjusted under 35 U.S.C. 154(b) by 559 days.

(21) Appl. No.: 17/121,129

(22) Filed: Dec. 14, 2020

(65) Prior Publication Data

US 2021/0371323 A1    Dec. 2, 2021

(30) Foreign Application Priority Data

May 28, 2020   (CN) .......................... 202010468888.7

(51) Int. Cl.
  *B23K 26/38*   (2014.01)
  *B23K 26/02*   (2014.01)
  (Continued)

(52) U.S. Cl.
  CPC .......... *C03B 33/0855* (2013.01); *B23K 26/02* (2013.01); *B23K 26/142* (2015.10);
  (Continued)

(58) Field of Classification Search
  CPC ... C03B 33/0855; C03B 33/06; B23K 26/142; B23K 26/702; B23K 26/02; B23K 26/16; B23K 26/38
  (Continued)

(56) References Cited

U.S. PATENT DOCUMENTS

| 2,968,723 A | * | 1/1961 | Karl | ........................ | H01J 37/24 |
| | | | | | 219/121.16 |
| 3,650,846 A | * | 3/1972 | Holland | ..................... | C22F 3/00 |
| | | | | | 148/903 |

(Continued)

FOREIGN PATENT DOCUMENTS

CN    210587861 U    *   5/2020

*Primary Examiner* — Jimmy Chou
(74) *Attorney, Agent, or Firm* — Tarolli, Sundheim, Covell & Tummino LLP

(57) ABSTRACT

The present invention provides a cutting method and equipment of auxiliary packaging containers for testing. The method includes: step S001, material feeding; step S002, laser cutting; performs circumferential cutting of the part of the packaging container to be cut by the laser cutting device on the equipment body; step S003, waste gas treatment; step S004, material unloading; the equipment includes an equipment body and a clamping and positioning device and a laser cutting device, the clamping and positioning device is provided on the lower side of the laser cutting device and can be rotated relative to the laser cutting device; the equipment body is equipped with a waste gas discharge device; the cutting method and equipment of auxiliary packaging containers for testing provided by the present invention overcomes the defects of poor cutting effect, narrow application range, inconvenient cutting and low efficiency of the existing cutting methods of packaging containers.

4 Claims, 5 Drawing Sheets

(51) Int. Cl.
  *B23K 26/142* (2014.01)
  *B23K 26/16* (2006.01)
  *B23K 26/70* (2014.01)
  *C03B 33/06* (2006.01)
  *C03B 33/085* (2006.01)

(52) U.S. Cl.
  CPC .............. *B23K 26/16* (2013.01); *B23K 26/38* (2013.01); *B23K 26/702* (2015.10); *C03B 33/06* (2013.01)

(58) Field of Classification Search
  USPC ..................................................... 219/121.67
  See application file for complete search history.

(56) References Cited

U.S. PATENT DOCUMENTS

| | | | | |
|---|---|---|---|---|
| 3,701,880 A * | 10/1972 | Rively | ............... | B23K 26/0648 428/34.4 |
| 3,768,414 A * | 10/1973 | Polcha | ................... | F42B 12/22 102/493 |
| 3,770,936 A * | 11/1973 | Rively | ............... | B23K 26/0823 219/121.81 |
| 3,839,005 A * | 10/1974 | Meyer | ................. | C03B 33/0955 219/121.6 |
| 4,272,872 A * | 6/1981 | Hess | ........................ | F16C 13/00 492/18 |
| 4,682,003 A * | 7/1987 | Minakawa | ........ | B23K 26/3576 219/121.72 |
| 4,731,254 A * | 3/1988 | Heineken | ............... | C03B 29/02 219/121.64 |
| 4,758,705 A * | 7/1988 | Hertzel | ................... | C21D 9/38 219/121.61 |
| 4,878,127 A * | 10/1989 | Zollman | ................ | B41C 1/145 358/3.32 |
| 5,079,401 A * | 1/1992 | Suchan | ............... | H04N 1/0692 219/121.84 |
| 5,198,636 A * | 3/1993 | Suchan | .................. | B41C 1/055 219/121.68 |
| 5,386,097 A * | 1/1995 | Ruckl | ..................... | B41C 1/145 219/121.68 |
| 5,662,821 A * | 9/1997 | Ruckl | ..................... | H04N 1/06 219/121.72 |
| 5,748,222 A * | 5/1998 | Roberts | ................. | B23K 26/06 347/241 |
| 5,770,123 A * | 6/1998 | Hatakeyama | ....... | H01J 37/3056 65/102 |
| 5,779,753 A * | 7/1998 | Vetter | .................... | B23K 26/0665 65/105 |
| 6,038,971 A * | 3/2000 | Fischer | ..................... | B41C 1/14 101/128.4 |
| 6,204,472 B1 * | 3/2001 | Muzzi | .................. | B23K 26/142 219/121.84 |
| 6,384,372 B1 * | 5/2002 | Sritulanont | .......... | B23K 26/142 219/121.84 |
| 6,768,504 B2 * | 7/2004 | Crawley | ............ | B23K 26/0344 219/121.78 |
| 7,115,209 B2 * | 10/2006 | Grimard | ................... | B44C 1/26 216/28 |
| 8,247,735 B2 * | 8/2012 | Cuvelier | ................. | C03B 33/06 65/227 |
| 8,552,338 B2 * | 10/2013 | Sercel | ................... | B23K 26/066 219/121.61 |
| 8,677,721 B2 * | 3/2014 | Piana | ....................... | G06K 5/00 53/131.2 |
| 9,517,508 B2 * | 12/2016 | Park | ........................ | B23B 3/065 |
| 9,533,355 B2 * | 1/2017 | Esser | ................... | B23B 25/06 |
| 9,623,526 B2 * | 4/2017 | Perez | .................. | B23B 25/00 |
| 9,682,452 B2 * | 6/2017 | Ueda | ...................... | B23Q 1/763 |
| 9,937,596 B2 * | 4/2018 | Maurer | ..................... | B23Q 1/76 |
| 9,981,831 B2 * | 5/2018 | Terzuolo | ................... | B66C 3/14 |
| 10,494,288 B2 * | 12/2019 | Hunzinger | ............ | C03B 23/095 |
| 11,027,381 B2 * | 6/2021 | Onushko | ............... | B23Q 3/064 |
| 2003/0192865 A1 * | 10/2003 | Cole, III | ............... | B23K 26/211 700/166 |
| 2004/0011773 A1 * | 1/2004 | Fritz | ..................... | B23K 26/03 219/121.64 |
| 2004/0024485 A1 * | 2/2004 | McCoy | .............. | B23K 26/0823 219/121.72 |
| 2006/0037948 A1 * | 2/2006 | Adams | ..................... | B67B 7/38 219/121.67 |
| 2006/0169679 A1 * | 8/2006 | Sato | ........................ | B23K 26/34 219/121.64 |
| 2006/0249491 A1 * | 11/2006 | Jurgensen | .......... | B23K 26/0676 219/121.76 |
| 2007/0034615 A1 * | 2/2007 | Kleine | ..................... | A61F 2/91 219/121.72 |
| 2008/0135531 A1 * | 6/2008 | Widmann | .............. | B23K 26/38 219/121.72 |
| 2008/0173623 A1 * | 7/2008 | Barclay | .............. | B23K 26/0846 219/121.72 |
| 2010/0147418 A1 * | 6/2010 | Piana | ........................ | G06K 5/00 374/45 |
| 2012/0060558 A1 * | 3/2012 | Haselhorst | ............ | C03B 23/092 65/29.21 |
| 2012/0298725 A1 * | 11/2012 | Biggs | ....................... | B23Q 3/08 228/2.1 |
| 2013/0001237 A1 * | 1/2013 | Marsh | ................... | C03C 23/007 220/660 |
| 2013/0270236 A1 * | 10/2013 | Burberry | ................... | B41C 1/05 219/121.68 |
| 2014/0202996 A1 * | 7/2014 | Forlong | ............ | B23Q 11/1015 409/136 |
| 2014/0263221 A1 * | 9/2014 | Minehara | ................... | G21F 9/28 219/121.73 |
| 2014/0290827 A1 * | 10/2014 | Heeman | ..................... | B65C 9/24 219/121.72 |
| 2015/0090082 A1 * | 4/2015 | Conrad | .................... | B26D 3/16 82/113 |
| 2015/0114043 A1 * | 4/2015 | Risch | ................... | C03B 23/045 65/374.13 |
| 2016/0016267 A1 * | 1/2016 | Beatty | ................. | B23K 37/0452 29/559 |
| 2017/0209961 A1 * | 7/2017 | Cavanaugh | ........ | B23K 26/0823 |
| 2018/0001422 A1 * | 1/2018 | Rajagopalan | ........ | B23K 26/282 |
| 2020/0016700 A1 * | 1/2020 | Schahuber | ........... | B23K 9/0282 |
| 2020/0018431 A1 * | 1/2020 | Takata | ............... | B23K 37/0538 |
| 2021/0379707 A1 * | 12/2021 | Schahuber | ......... | B23K 37/0533 |

* cited by examiner

CUTTING METHOD AND EQUIPMENT OF AUXILIARY PACKAGING CONTAINERS FOR TESTING

RELATED APPLICATIONS

The present invention is a Nonprovisional application under 35 USC 111(a), claiming priority to Serial No. CN 202010468888.7, filed on 28 May 2020, the entirety of which is incorporated herein by reference.

TECHNICAL FIELD

The present invention relates to the field of packaging containers, in particular to a cutting method and equipment of auxiliary packaging containers for testing.

Background Art

A packaging container is a container used to pack products. Common packaging containers include packaging bottles, packaging cans, and packaging boxes. Due to their different capacities and shapes, their weights are also different. Most packaging containers are made of materials that are not easy to leak, such as ceramic, glass, plastic or metal.

In order to control the quality of packaging containers, the weight, thickness, and thickness uniformity of the packaging containers need to be tested during the production process, so the packaging containers need to be cut into slices to facilitate testing. There are two main cutting methods currently used: one is thermal fuse cutting, which uses heating wires to cut packaging containers. In this way, the cutting traces are not smooth, which damages the end surface, and the incision is easy to cause loss of materials, which will affect the result of the test; the other is to cut with a rotating blade. This method can only cut packaging containers with a smaller wall thickness, but cannot cut packaging containers with a larger wall thickness, and this method can only cut packaging containers with conventional shapes. The special-shaped packaging container cannot be cut; and the existing cutting method requires the liquid in the packaging container to be poured out before cutting, which is time-consuming and labor-intensive. Therefore, no matter what kind of existing cutting method, there are defects of poor cutting effect, narrow application range, inconvenient cutting and low efficiency.

SUMMARY OF THE INVENTION

Technical Problems to be Solved

The problems to be solved by the present invention is to provide a cutting method and equipment of auxiliary packaging containers for testing to overcome the shortcomings of poor cutting effect, narrow application range, inconvenient cutting and low efficiency of existing cutting methods of packaging containers.

Technical Solutions

To resolve the technical problems, the present invention provides a cutting method of auxiliary packaging containers for testing, which includes the following steps:

Step S001, material feeding; mounting the packaging container to be cut on the clamping and positioning device of the equipment body, and the clamping and positioning device drives the packaging container to rotate;

Step S0011, automatic adjustment of the cutting position; inputs cutting position parameters on the human-machine interaction interface of the equipment body, the control unit on the equipment body drives the clamping and positioning device to move, and places the cutting position of the packaging container directly below the laser cutting device. The clamping and positioning device includes a pneumatic three-jaw chuck; clamping the packaging container on the three-jaw chuck, and the guide sliding seat connected with the three-jaw chuck drives the three-jaw chuck to slide in a horizontal direction under the guidance of a guide rail on the equipment body, so that the cutting part of the packaging container is placed directly under the laser cutting device; when the packaging container is relatively short, it can be directly clamped on the three-jaw chuck.

In the above step, the clamping and positioning device further includes a slidable horn-shaped clamping sleeve and a height-adjustable V-shaped block; while feeding material, one end of the packaging container to be cut is inserted into the horn-shaped clamping sleeve, and the other end is clamped in the three-jaw chuck; then adjust the height of the V-shaped block to abut the outer circumference of the packaging container against the pulley of the V-shaped block, and then the V-shaped block is locked; finally, after the cutting position is adjusted, the horn-shaped clamping sleeve is locked. When the packaging container is relatively longer and heavier, a three-jaw chuck and a V-shaped block can be used for supporting and positioning; when the packaging container is of special shape, a V-shaped block, a three-jaw chuck and a horn-shaped clamping sleeve can be used together for supporting and positioning. Through the cooperation of step S001 and Step S0011, the packaging container can be accurately positioned and clamped, and can be applied to packaging containers of various shapes and weights, so the application range becomes wider.

Step S0012, automatic adjustment of the height of the laser head; inputs the shape parameters of the packaging container on the human-machine interaction interface of the equipment body and the height parameters of the laser head on the laser cutting device, and the control unit on the equipment body drives the laser cutting device to move, thereby adjusting the distance between the laser head and the packaging container. The laser cutting device includes the laser head connected to a laser generator, a screw seat fixed to the laser head, and a screw rod matched with the screw seat; through the rotation of the screw rod, the screw rod drives the screw seat to slide, and at the same time drives the laser head to slide too, thereby adjusting the distance between the laser head and the part to be cut.

Step S002, laser cutting; performs circumferential cutting of the part of the packaging container to be cut by the laser cutting device on the equipment body; By adopting laser cutting in step S002, packaging containers with various wall thicknesses can be cut non-destructively, with smooth cutting effect, no material loss, and good cutting quality, which is convenient for subsequent tests.

Step S003, waste gas treatment; performs suction and discharge of the waste gas generated in above steps S through the suction pipe on the equipment body, and performs treatment by the filter treatment device connected to the suction pipe before discharged to external environment; the waste gas can be treated through step S003, which is applicable for laboratory environment.

Step S0031, waste liquid treatment; the waste liquid generated by cutting flows through a water tank into a liquid collection device connected to the water tank located on the lower side of the clamping and positioning device, and is treated before discharged to external environment. With the water tank, the liquid-containing packaging container can be cut directly, making the operation more convenient.

Step S004, material unloading; the cut packaging container is unloaded from the clamping and positioning device and sent to a laboratory for testing.

The present invention further provides a cutting equipment of auxiliary packaging containers for testing, which includes an equipment body and a clamping and positioning device and a laser cutting device which are installed on the equipment body, and the clamping and positioning device is provided on the lower side of the laser cutting device and can be rotated relative to the laser cutting device; a waste gas discharge device is installed on the equipment body, and the waste gas discharge device is used to suck and remove the exhaust gas generated in the cutting process; during cutting, the packaging container to be cut is clamped on the clamping and positioning device and rotated under the driving of the clamping and positioning device, and the laser cutting device performs cutting to the packaging container, and the waste gas discharge device sucks and removes waste gas generated during cutting.

Further, the laser cutting device can slide in a vertical direction; the laser cutting device includes a laser head connected with a laser generator, a screw seat fixed with the laser head and a rotatable screw rod, and the screw seat is slidably mounted on the screw rod. The laser cutting device adopts laser cutting, thus packaging containers with various wall thicknesses can be cut non-destructively, with smooth cutting effect, no material loss, and good cutting quality, which is convenient for subsequent tests. And the distance between the laser head and the packaging container can be adjusted, so it can be applied to packaging containers of different materials and different types, with a wide range of applications and convenient cutting.

Further, the clamping and positioning device can slide in a horizontal direction; the clamping and positioning device includes a pneumatic three-jaw chuck, and a guide rail installed on the equipment body, a guide sliding seat is slidably installed on the guide rail, and the guide sliding seat is connected to the three-jaw chuck. The clamping and positioning device further includes a horn-shaped clamping sleeve, and the equipment body includes a height-adjustable V-shaped block which is installed between the horn-shaped clamping sleeve and the three-jaw chuck, and a plurality of pulleys are rotatably installed on the V-shaped block; when feeding material, one end of the packaging container is inserted into the horn-shaped clamping sleeve, the other end is clamped in the three-jaw chuck, and the outer circumferential surface of the packaging container abuts against the pulleys. When the packaging container is relatively short, it can be directly clamped on the three-jaw chuck. When the packaging container is relatively longer and heavier, a three-jaw chuck and a V-shaped block can be used for supporting and positioning; when the packaging container is of special shape, a V-shaped block, a three-jaw chuck and a horn-shaped clamping sleeve can be used together for supporting and positioning. Through the cooperation of V-shaped block, three-jaw chuck and horn-shaped clamping sleeve, the packaging container can be accurately positioned and clamped, and can be applied to packaging containers of various shapes and weights, so the application range becomes wider.

Further, the waste gas discharge device includes a suction pipe, and the suction pipe is connected to a filter treatment device; the equipment body includes a water tank which is installed on the lower side of the clamping positioning device, and the water tank is connected with the liquid collection device. The waste gas can be treated through the setup of the suction pipe, which is applicable for laboratory environment. A water tank is further provided, so the liquid-containing packaging container can be directly cut, making the operation more convenient.

Beneficial Effects

The present invention provides a cutting method and equipment of auxiliary packaging containers for testing. The method is simple and convenient to operate. Through step S002, laser cutting is used to cut packaging containers with various wall thicknesses without damage, with smooth cuts, no loss of materials, and good cutting quality. It is convenient for subsequent testing; through the cooperation of step S001 and step S0011, the packaging container can be accurately positioned and clamped, and is applicable to packaging containers of various shapes and weights, and the application range is wider; through the cooperation of step S0011 and step S0012, a high degree of automation is achieved with easy operation and high cutting efficiency; and through step S003, the waste gas can be treated, which is suitable for laboratory environment; A water tank is further provided, which enable direct cutting of liquid-containing packaging containers, making the operation more convenient.

This equipment has more advantages than the existing cutting means, and it is nearly non-destructive; it includes a clamping and positioning device and a laser cutting device. The clamping and positioning device cooperates with a three-jaw chuck, a horn-shaped clamping sleeve and a V-shaped block to carry out precise positioning and clamping of packaging containers, and is applicable to packaging containers of various shapes and weights, with a wide range of applications; The laser cutting device adopts laser head cutting, which can cut packaging containers of various wall thicknesses with good cutting quality. The cutting effect is smooth and no loss of material occurs, which is convenient for subsequent testing; the provision of the suction pipe enables waste gas treatment; and the overall degree of automation is high, which is easy to operate; it overcomes defects of existing cutting methods for packaging containers, such as poor cutting effect, narrow application range, inconvenience operation and low efficiency etc.

DESCRIPTION OF ACCOMPANIED FIGURES

The corresponding reference numeral parts in the accompanied figures are: 1. Equipment body; 2. Clamping and positioning device; 3. Laser cutting device; 4. Suction pipe; 5. Packaging container; 6. Guide rail; 7. Guide sliding seat; 8. Water tank; 9. Third motor; 21. Three-jaw chuck; 22.

Horn-shaped clamping sleeve; 23. V-shaped block; 24. Pulley; 25. Sliding sleeve; 26. First motor; 27. Rotating rod; 28. Support frame; 31. Laser head; 32. Screw seat; 33. Screw rod; 34. Second motor; 35. Support platform; 231. Adjusting plate; 232. Oval slot; 233. Base; 234. Locking rod.

DETAILED IMPLEMENTATION METHOD

The specific implementation of the present invention will be described in further detail below in conjunction with the accompanied figures and embodiments. The following embodiments are used to illustrate the present invention, but not to limit the scope of the present invention.

Figure 1:
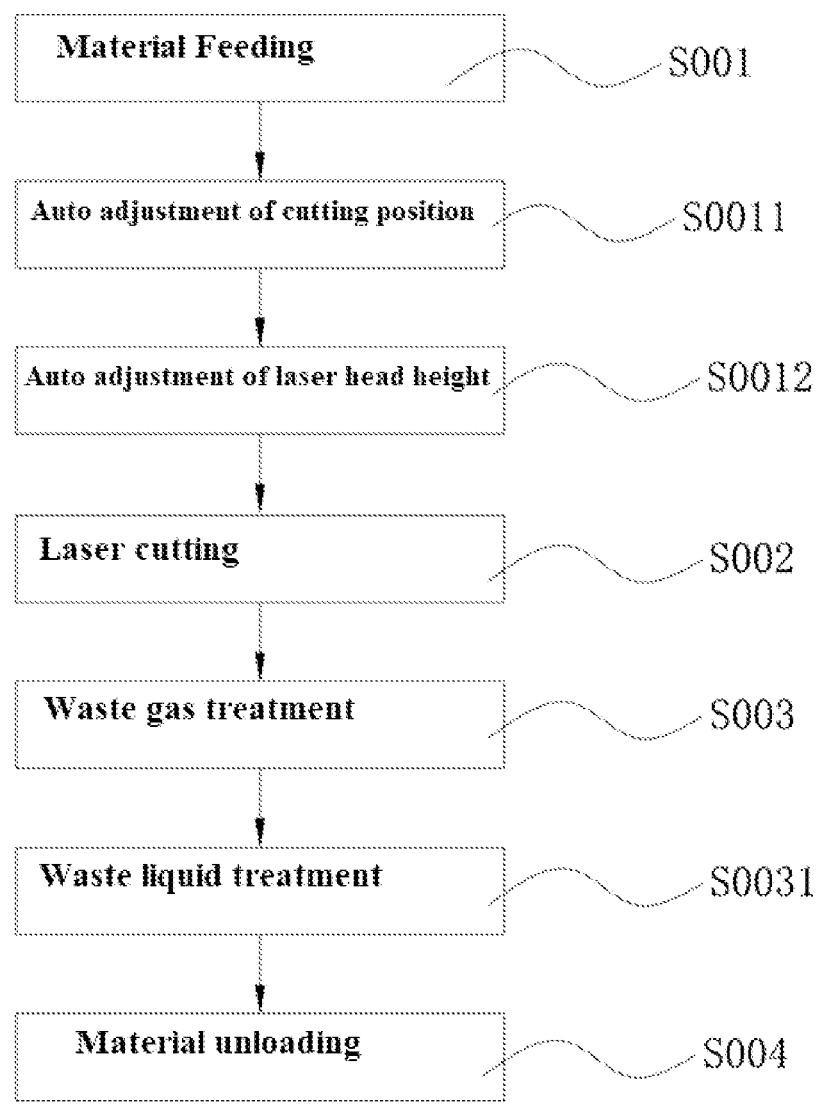
FIG. 1 is a schematic block flow diagram of the cutting method of auxiliary packaging containers for testing according to the present invention.

Referring to FIG. 1, this embodiment provides a cutting method of auxiliary packaging containers for testing. The cutting method includes the following steps:

Step S001, material feeding; mounting the packaging container 5 to be cut on the clamping and positioning device 2 of the equipment body 1, and the clamping and positioning device 2 drives the packaging container 5 to rotate;

Step S0011, automatic adjustment of the cutting position; inputs cutting position parameters on the human-machine interaction interface of the equipment body 1, the control unit on the equipment body 1 drives the clamping and positioning device 2 to move, and places the cutting position of the packaging container 5 directly below the laser cutting device 3. The clamping and positioning device 2 includes a pneumatic three-jaw chuck 21; clamping the packaging container 5 on the three-jaw chuck 21, and the guide sliding seat 7 connected with the three-jaw chuck 21 drives the three-jaw chuck 21 to slide in a horizontal direction under the guidance of a guide rail 6 on the equipment body 1, so that the cutting part of the packaging container 5 is placed directly under the laser cutting device 3; when the packaging container is relatively short, it can be directly clamped on the three-jaw chuck.

In the above step, the clamping and positioning device 2 further includes a slidable horn-shaped clamping sleeve 22 and a height-adjustable V-shaped block 23; while feeding material, one end of the packaging container 5 to be cut is inserted into the horn-shaped clamping sleeve 22, and the other end is clamped in the three-jaw chuck 21; then adjust the height of the V-shaped block 23 to abut the outer circumference of the packaging container 5 against the pulley 24 of the V-shaped block 23, and then the V-shaped block 23 is locked; finally, after the cutting position is adjusted, the horn-shaped clamping sleeve 22 is locked. When the packaging container is relatively longer and heavier, a three-jaw chuck and a V-shaped block can be used for supporting and positioning; when the packaging container is of special shape, a V-shaped block, a three-jaw chuck and a horn-shaped clamping sleeve can be used together for supporting and positioning. Through the cooperation of step S001 and Step S0011, the packaging container can be accurately positioned and clamped, and can be applied to packaging containers of various shapes and weights, so the application range becomes wider.

Step S0012, automatic adjustment of the height of the laser head; inputs the shape parameters of the packaging container 5 on the human-machine interaction interface of the equipment body 1 and the height parameters of the laser head 31 on the laser cutting device 3, and the control unit on the equipment body 1 drives the laser cutting device 3 to move, thereby adjusting the distance between the laser head 31 and the packaging container 5. The laser cutting device 3 includes the laser head 31 connected to a laser generator, a screw seat 32 fixed to the laser head 31, and a screw rod 33 matched with the screw seat 32; through the rotation of the screw rod 33, the screw rod 33 drives the screw seat 32 to slide, and at the same time drives the laser head 31 to slide too, thereby adjusting the distance between the laser head 31 and the part to be cut.

Step S002, laser cutting; performs circumferential cutting of the part of the packaging container 5 to be cut by the laser cutting device 3 on the equipment body 1; By adopting laser cutting in step S002, packaging containers with various wall thicknesses can be cut non-destructively, with smooth cutting effect, no material loss, and good cutting quality, which is convenient for subsequent tests.

Step S003, waste gas treatment; performs suction and discharge of the waste gas generated in step S002 through the suction pipe 4 on the equipment body 1, and performs treatment by the filter treatment device connected to the suction pipe 4 before discharged to external environment; the waste gas can be treated through step S003, which is applicable for laboratory environment.

Step S0031, waste liquid treatment; the waste liquid generated by cutting flows through a water tank 8 into a liquid collection device connected to the water tank 8 located on the lower side of the clamping and positioning device 2, and is treated before discharged to external environment. With the water tank, the packaging container can be directly mounted on the clamping and positioning device. If there is liquid in the packaging container, it is not necessary to pour out the liquid before operation, making the operation more convenient.

Step S004, material unloading; the cut packaging container 5 is unloaded from the clamping and positioning device 2 and sent to a laboratory for testing.

The cutting method of auxiliary packaging containers for testing provided in this embodiment is mainly used for testing of auxiliary packaging containers. The overall operation is simple, and the applicable packaging container types are wide. The packaging container can be finished or semi-finished tube embryos; the method is simple and convenient to operate. Through step S002, laser cutting is used to cut packaging containers with various wall thicknesses without damage, with smooth cuts, no loss of materials, and good cutting quality. It is convenient for subsequent testing; through the cooperation of step S001 and step S0011, the packaging container can be accurately positioned and clamped, and is applicable to packaging containers of various shapes and weights, and the application range is wider; through the cooperation of step S0011 and step S0012, a high degree of automation is achieved with easy operation and high cutting efficiency; and through step S003, the waste gas can be treated, which is suitable for laboratory environment; A water tank is further provided, which enable direct cutting of liquid-containing packaging containers, making the operation more convenient. it overcomes defects of existing cutting methods for packaging containers, such as poor cutting effect, narrow application range, inconvenience operation and low efficiency etc.

Figure 2:
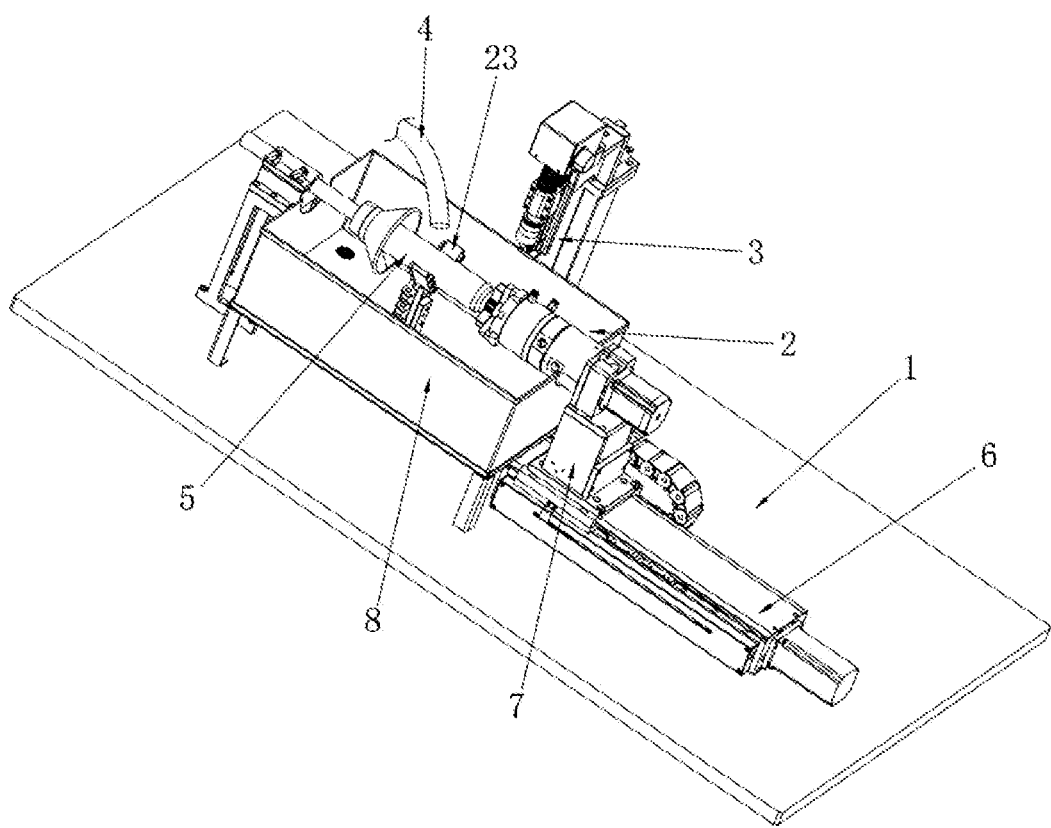
FIG. 2 is a perspective view of the cutting equipment of auxiliary packaging containers for testing according to the present invention.
Figure 3:
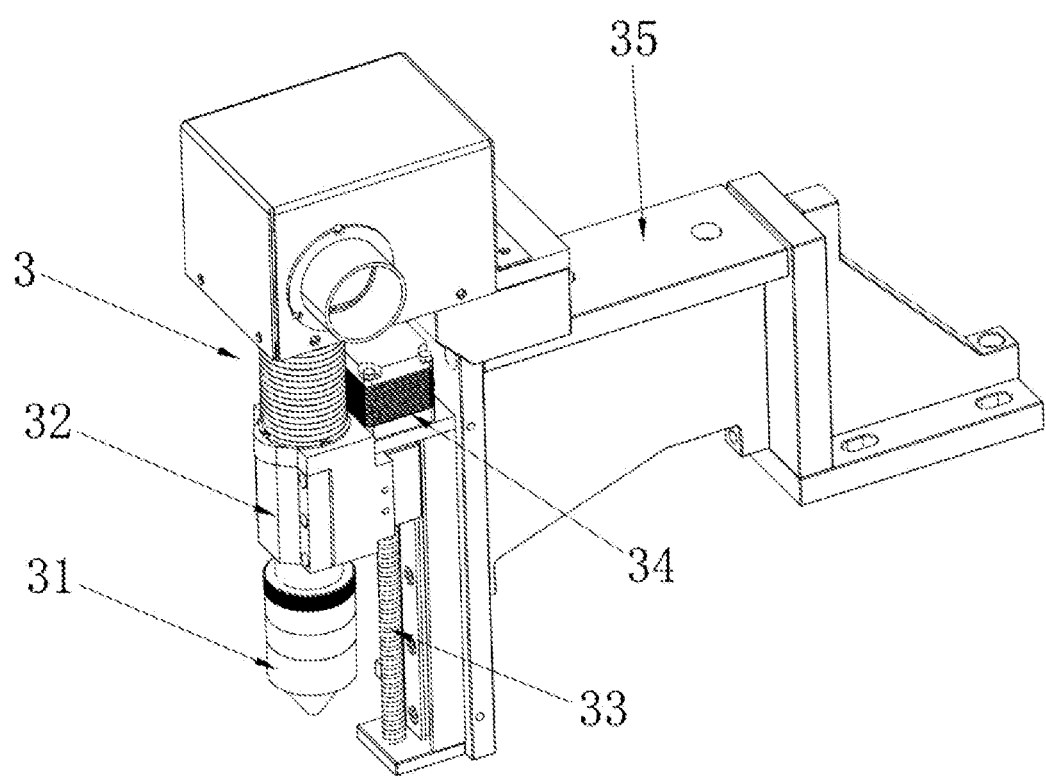
FIG. 3 is a perspective view of the laser cutting device of the cutting equipment of auxiliary packaging containers for testing according to the present invention.

Referring to FIGS. 2-5, the embodiment further provides a cutting equipment of auxiliary packaging containers for testing, which includes an equipment body 1 and a clamping and positioning device 2 and a laser cutting device 3 which are installed on the equipment body 1, and the clamping and positioning device 2 is provided on the lower side of the laser cutting device 3 and can be rotated relative to the laser cutting device 3;

Referring to FIGS. 2 and 3, the laser cutting device 3 can slide in a vertical direction; the laser cutting device 3 includes a laser head 31 connected with a laser generator, a screw seat 32 fixed with the laser head 31 and a rotatable screw rod 33, and the screw seat 32 is slidably mounted on the screw rod 33. A support platform 35 is fixed on the equipment body 1, and a second motor 34 is fixed on the support platform 35. The second motor 34 is connected to the screw rod 33 and drives the screw rod 33 to rotate, so that the laser head 31 can be adjusted to slide in a vertical direction. The laser cutting device adopts laser cutting, thus packaging containers with various wall thicknesses, shapes and quality can be cut with good cutting quality, smooth cutting effect and no material loss, which is convenient for subsequent tests.

Figure 4:
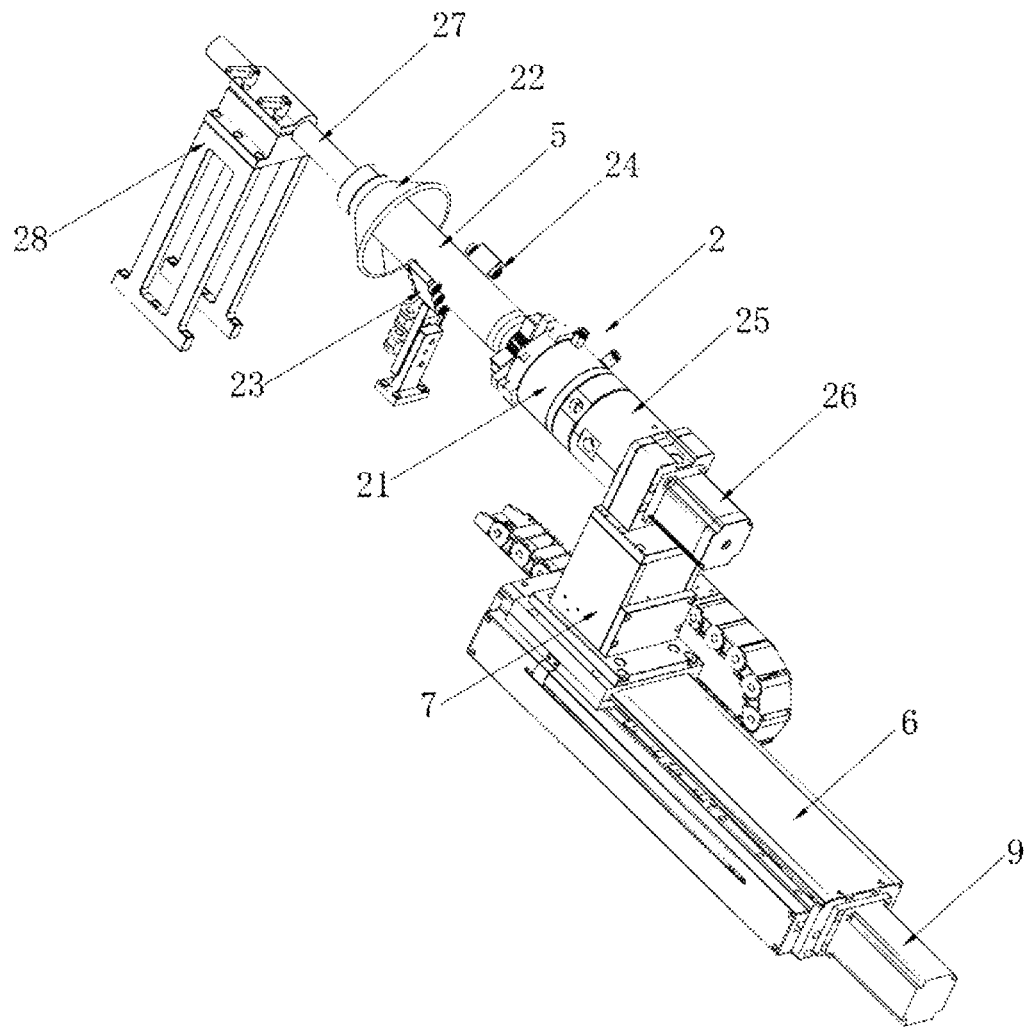
FIG. 4 is a perspective view of the clamping and positioning device of the cutting equipment of auxiliary packaging containers for testing according to the present invention.
Figure 5:
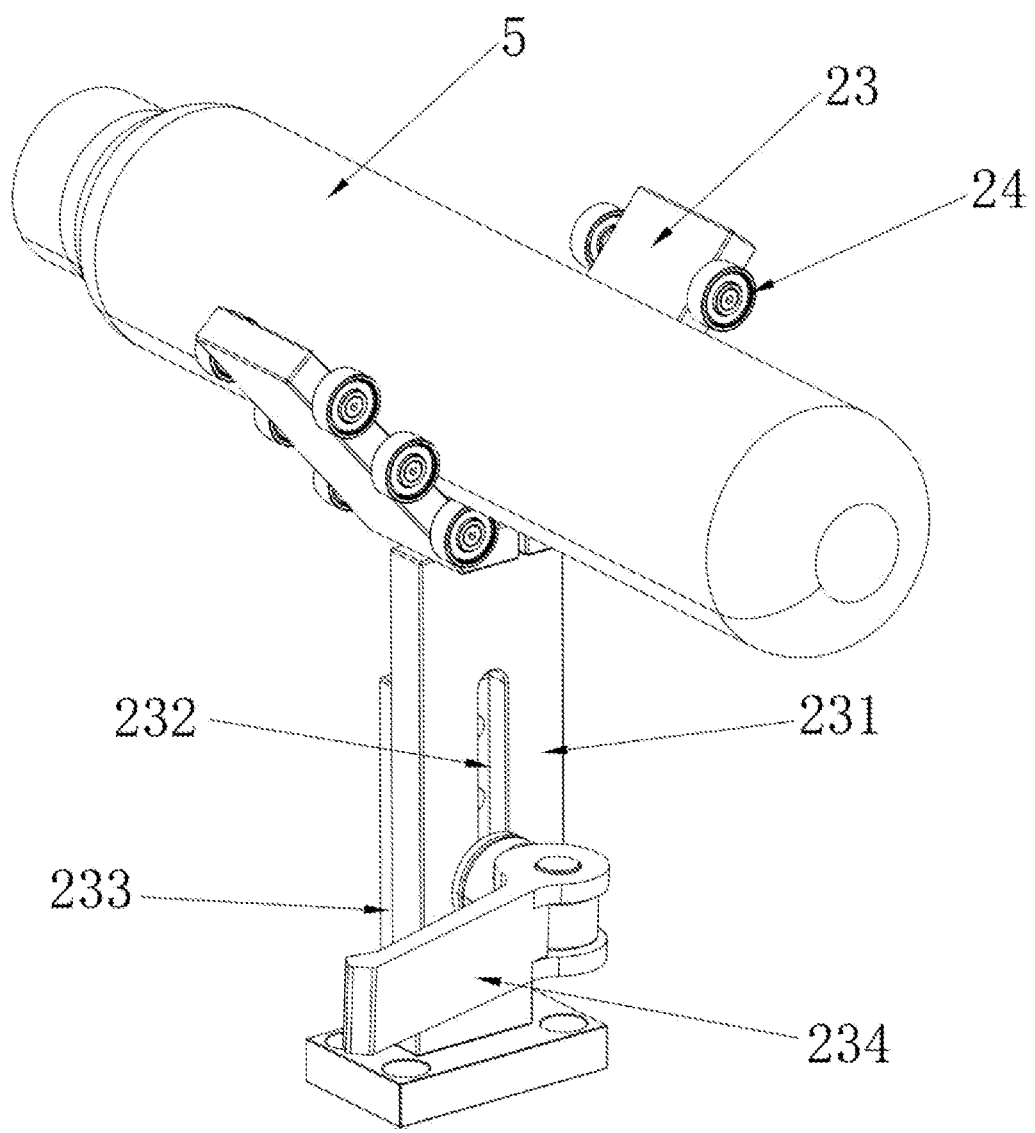
FIG. 5 is a perspective view of the V-shaped block of the cutting equipment of auxiliary packaging containers for testing according to the present invention.

Referring to FIGS. 2 and 4, the clamping and positioning device 2 can slide in a horizontal direction; The clamping and positioning device 2 includes a pneumatic three-jaw chuck 21 and a slidable horn-shaped clamping sleeve 22. The equipment body 1 includes a height-adjustable V-shaped block 23 which is installed between the horn-shaped clamping sleeve 22 and the three-jaw chuck 21, and a plurality of pulleys 24 are rotatably installed on the V-shaped block 23; A support frame 28 is fixed on the equipment body 1, and a rotating rod 27 is slidably mounted on the support frame 28. The rotating rod 27 is connected with the horn-shaped clamping sleeve 22. A locking rod 234 for locking the rotating rod 27 is installed on the support frame 28. Referring to FIG. 5, the V-shaped block 23 is fixedly connected to the adjusting plate 231. The adjusting plate 231 is provided with an oval slot 232, the bottom of the water tank 8 is fixed with a base 233, and the locking rod 234 passes through the oval slot 232 to connect to the base 233.

When feeding material, one end of the packaging container 5 is inserted into the horn-shaped clamping sleeve 22, the other end is clamped in the three-jaw chuck 21, and the outer circumferential surface of the packaging container 5 abuts against the pulleys 24. When the packaging container 5 is relatively short, it can be directly clamped on the three-jaw chuck 21, without using the V-shaped block 23 and horn-shaped clamping sleeve 22; When the packaging container is relatively longer and heavier, a three-jaw chuck and a V-shaped block can be used for supporting and positioning; when the packaging container is of special shape, a V-shaped block, a three-jaw chuck and a horn-shaped clamping sleeve can be used together for supporting and positioning. Through the cooperation of V-shaped block, three-jaw chuck and horn-shaped clamping sleeve, the packaging container can be accurately positioned and clamped, and can be applied to packaging containers of various shapes and weights, so the application range becomes wider.

Referring to FIG. 2, a guide rail 6 is installed on the equipment body 1, a guide sliding seat 7 is slidably installed on the guide rail 6, and the guide sliding seat 7 is connected to the three-jaw chuck 21. The guide rail 6 is equipped with a third motor 9 for driving the sliding of the guide sliding seat 7 and a first motor 26 for driving the three-jaw chuck 21 to rotate is installed on the guide sliding seat 7. The first motor 26 passes through the sliding sleeve 25 and connected to the three-jaw chuck 21. The cutting position can be automatically adjusted through the cooperation of the guide rail and the guide sliding seat, manual operation is reduced, the degree of automation is high, and the operation is simple.

Referring to FIG. 2, a waste gas discharge device is installed on the equipment body 1. The waste gas discharge device includes a suction pipe 4, and the suction pipe 4 is used to suck and remove the exhaust gas generated in the cutting process; the suction pipe 4 is connected to a filter treatment device; the equipment body 1 includes a water tank 8 which is installed on the lower side of the clamping positioning device 2, and the water tank 8 is connected with the liquid collection device. The waste gas can be treated through the setup of the suction pipe, which is applicable for laboratory environment. With the water tank, the packaging container can be directly mounted on the clamping and positioning device. If there is liquid in the packaging container, it is not necessary to pour out the liquid before operation, making the operation more convenient.

When cutting, the packaging container 5 to be cut is clamped on the clamping and positioning device 2, one end of the packaging container 5 is inserted into the horn-shaped clamping sleeve 22, and the other end is clamped in the three-jaw chuck 21, and the outer circumferential surface of the packaging container 5 abuts on the pulley 24 and locks the V-shaped block 23; then inputs the cutting position parameters on the equipment body 1, and the guide sliding seat 7 drives the three-jaw chuck 21 and the packaging container 5 to place the cutting position right below the laser head 31, then lock the horn-shaped clamping sleeve 22, and then the three-jaw chuck 21 drives the packaging container 5 to rotate; then inputs the shape of the packaging container 5 and the height of the laser head 31 to adjust the distance between the laser head 31 and the laser head 31, and then the laser head 31 perform cutting of the packaging container 5, and the suction pipe 4 sucks off the waste gas generated during the cutting process to complete the cutting process.

The cutting equipment of auxiliary packaging containers for testing provided in this embodiment is mainly used for testing of auxiliary packaging containers. The overall operation is simple, and the applicable packaging container types are wide. The packaging container can be finished or semi-finished tube embryos. Compared with the existing cutting methods, this equipment has more advantages and is nearly non-destructive (for a wall thickness of less than or equal to 0.4 mm, the loss is 0-0.2 g; for a wall thickness exceeding 0.4 mm, the loss is more, but usually not greater than 0.5 g); The equipment includes a clamping and positioning device and a laser cutting device. The clamping and positioning device cooperates with a three-jaw chuck, a horn-shaped clamping sleeve and a V-shaped block, able to accurately position and clamp the packaging container, and can be applied to packaging containers of various shapes and weights; the laser cutting device adopts a laser head to cut, with good cutting quality, smooth cutting effect, and no loss of material, which is convenient for subsequent testing; the setting of a suction pipe can treat the waste gas; and the overall degree of automation is high, which is easy to operate; It overcomes defects of existing cutting methods for packaging containers, such as poor cutting effect, narrow application range, inconvenience operation and low efficiency etc.

The above are only the preferred embodiments of the present invention. It should be pointed out that for those of ordinary skill in the art, without departing from the technical principles of the present invention, several improvements and modifications can be made. These improvements and modifications should also be regarded as the protection scope of the present invention.

What is claimed is:

1. A cutting equipment for auxiliary packaging containers for testing, the cutting equipment comprising:
   an equipment body;
   a clamping and positioning device installed on the equipment body;
   a laser cutting device installed on the equipment body, the clamping and positioning device being provided on a lower side of the laser cutting device, the clamping and positioning device can rotate and slide in a horizontal direction relative to the laser cutting device; and a waste gas discharge device is installed on the equipment body, the waste gas discharge device is used to suck and remove the exhaust gas generated in the cutting process; and a height-adjustable V-shaped block installed on the equipment body, the height-adjustable V-shaped block including pulleys to support the auxiliary packaging container, wherein during cutting, the auxiliary packaging container to be cut is clamped on the clamping and positioning device and rotated under the driving of the clamping and positioning device, and the laser cutting device performs cutting to the auxiliary packaging container, and the waste gas discharge device sucks and removes waste gas generated during cutting, and wherein the clamping and positioning device includes a pneumatic three-jaw chuck, and a guide rail installed on the equipment body, a guide sliding seat is slidably installed on the guide rail, and the guide sliding seat is connected to the three-jaw chuck.

2. The cutting equipment for auxiliary packaging containers for testing of claim 1, wherein the laser cutting device can slide in a vertical direction; the laser cutting device includes a laser head connected with a laser generator, a screw seat fixed with the laser head and a rotatable screw rod, and the screw seat is slidably mounted on the screw rod.

3. The cutting equipment for auxiliary packaging containers for testing of claim 1, wherein the clamping and positioning device further includes a slidable horn-shaped clamping sleeve, where the height-adjustable V-shaped block is installed between the horn-shaped clamping sleeve and the three-jaw chuck, and when feeding material, one end of the auxiliary packaging containers are inserted into the horn-shaped clamping sleeve, the other end is clamped in the three-jaw chuck, and the outer circumferential surface of the auxiliary packaging containers abuts against the pulleys.

4. A cutting equipment for auxiliary packaging containers for testing, the cutting equipment comprising:
   an equipment body;
   a clamping and positioning device installed on the equipment body;
   a laser cutting device installed on the equipment body, the clamping and positioning device being provided on a lower side of the laser cutting device, the clamping and positioning device can rotate and slide in a horizontal direction relative to the laser cutting device; and
   a waste gas discharge device is installed on the equipment body, the waste gas discharge device is used to suck and remove the exhaust gas generated in the cutting process,
   wherein during cutting, the auxiliary packaging container to be cut is clamped on the clamping and positioning device and rotated under the driving of the clamping and positioning device, and the laser cutting device performs cutting to the auxiliary packaging container, and the waste gas discharge device sucks and removes waste gas generated during cutting, and
   wherein the waste gas discharge device includes a suction pipe, and the suction pipe is connected to a filter treatment device; the equipment body includes a water tank which is installed on the lower side of the clamping positioning device, and the water tank is connected with the liquid collection device.

* * * * *